US011669780B2

(12) United States Patent
Zhang et al.

(10) Patent No.: US 11,669,780 B2
(45) Date of Patent: Jun. 6, 2023

(54) ASYNCHRONOUS MULTIPLE SCHEME META LEARNING

(71) Applicant: International Business Machines Corporation, Armonk, NY (US)

(72) Inventors: Li Zhang, Yorktown Heights, NY (US); Wei Zhang, Elmsford, NY (US); Xiaodong Cui, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 882 days.

(21) Appl. No.: 16/675,555

(22) Filed: Nov. 6, 2019

(65) Prior Publication Data

US 2021/0133636 A1 May 6, 2021

(51) Int. Cl.
*G06N 20/20* (2019.01)

(52) U.S. Cl.
CPC .................................. *G06N 20/20* (2019.01)

(58) Field of Classification Search
CPC ..................................................... G06N 20/20
USPC .......................................................... 706/12
See application file for complete search history.

(56) References Cited

U.S. PATENT DOCUMENTS

| | | |
|---|---|---|
| 6,449,603 B1 | 9/2002 | Hunter |
| 2017/0185895 A1 | 6/2017 | Chen |
| 2017/0308789 A1 | 10/2017 | Langford |
| 2018/0129969 A1 | 5/2018 | Feng |
| 2018/0240010 A1 | 8/2018 | Faivishevsky |
| 2018/0253646 A1 | 9/2018 | Feng |
| 2018/0307972 A1* | 10/2018 | Feng .................... G06F 12/1009 |
| 2018/0336458 A1* | 11/2018 | Tomioka .................. G06N 3/08 |
| 2018/0336464 A1 | 11/2018 | Karras |

OTHER PUBLICATIONS

Chan, et al., "Toward Parallel and Distributed Learning by Meta-Learning", AAAI Technical Report WS-93-02, 1993 (Year: 1993).*
Agarwal, et al., "Distributed Delayed Stochastic Optimization", Part of: Advances in Neural Information Processing Systems 24 (NIPS 2011), 9 pages.
Cho et al., "PowerAI DDL", IBM Research, Aug. 8, 2017, arXiv:1708.02188v1 [cs.DC] Aug. 7, 2017, 10 pages.
Dekel et al., "Optimal Distributed Online Prediction Using Mini-Batches", Journal of Machine Learning Research 13 (2012) 165-202, Submitted Nov. 2010, Revised Oct. 2011; Published Jan. 2012, © 2012 Ofer Dekel, Ran Gilad-Bachrach, Ohad Shamir and Lin Xiao.

(Continued)

*Primary Examiner* — Tsu-Chang Lee
(74) *Attorney, Agent, or Firm* — David K. Mattheis

(57) ABSTRACT

Building machine learning models by receiving, a plurality of training process scores associated with the model parameter lists, determining, a best model parameter list according to the training process scores, determining a descendant model parameter list according to the best model parameter list, wherein the descendant parameter list comprises a portion of the best model parameter list, distributing the descendant model parameter list, conducting a model training process according to the descendant model parameter list, determining a training process score according to the descendant model parameter list, and sending the training process score for the descendant model parameter list.

20 Claims, 4 Drawing Sheets

(56) References Cited

OTHER PUBLICATIONS

Ghadimi et al., "Mini-batch Stochastic Approximation Methods for Nonconvex Stochastic Composite Optimization", arXiv:1308.6594v2 [math.OC] Sep. 5, 2013, 33 pages.
Li et al., "Scaling Distributed Machine Learning with the Parameter Server", This paper is included in the Proceedings of the 11th USENIX Symposium on Operating Systems Design and Implementation. Oct. 6-8, 2014, Broomfield, CO, (OSDI '14), 17 pages.
Mell et al., "The NIST Definition of Cloud Computing", Recommendations of the National Institute of Standards and Technology, Special Publication 800-145, Sep. 2011, 7 pages.
Ormandi et al., "Asynchronous Peer-to-peer Data Mining with Stochastic Gradient Descent", in Proc. Euro-Par 2011, Springer LNCS 6852, pp. 528-540, doi:10.1007/978-3-642- 23400-2_49.
Paine et al., "GPU Asynchronous Stochastic Gradient Descent to Speed Up Neural Network Training", arXiv:1312.6186v1 [cs.CV] Dec. 21, 2013, 6 pages.
Patarasuk et al., "Bandwidth Optimal All-reduce Algorithms for Clusters of Workstations", Journal of Parallel and Distributed Computing, vol. 69 Issue 2, Feb. 2009, 24 pages.
Wang et al., "Nexus: Bringing Efficient and Scalable Training to Deep Learning Frameworks", 2017 IEEE 25th International Symposium on Modeling, Analysis, and Simulation of Computer and Telecommunication Systems, © 2017 IEEE, DOI 10.1109/MASCOTS.2017.34, 10 pages.
Zhang et al., "Asynchronous Stochastic Gradient Descent for DNN Training", ICASSP 2013, © 2013 IEEE, 4 pages.

\* cited by examiner

ASYNCHRONOUS MULTIPLE SCHEME META LEARNING

BACKGROUND

The disclosure relates generally to training machine learning models. The disclosure relates particularly to the asynchronous, multi-scheme, meta learning training of machine learning models.

Cloud computing environments provide scalable computing resources which can support machine learning activities including training and using neural networks. Cloud computing environments may be heterogeneous in terms of computing device speeds, network connectivity distances and associated connection speeds and data transfer rates. The environments may also have varying levels of system noise. Cloud environments are also dynamic as cloud computing devices enter and exit the computing environment over time.

Synchronous training of machine learning systems, such as neural networks, includes the use of a single training algorithm and model parameters are synchronously updated during training. Average node weights are computed across all neural network learners and then applied at one time. Asynchronous training of neural networks can include the use of algorithms to determine node weights and the application of determined weights to a model in training as the weights become available rather than as complete sets of weights become available for synchronous application.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable building machine learning models by generating and evaluating model parameter sets associated with training machine learning models.

Aspects of the invention disclose methods, systems and computer readable media associated with building machine learning models by receiving, a plurality of training process scores associated with the model parameter lists, determining, a best model parameter list according to the training process scores, determining a descendant model parameter list according to the best model parameter list, wherein the descendant parameter list comprises a portion of the best model parameter list, distributing the descendant model parameter list, conducting a model training process according to the descendant model parameter list, determining a training process score according to the descendant model parameter list, and sending the training process score for the descendant model parameter list.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
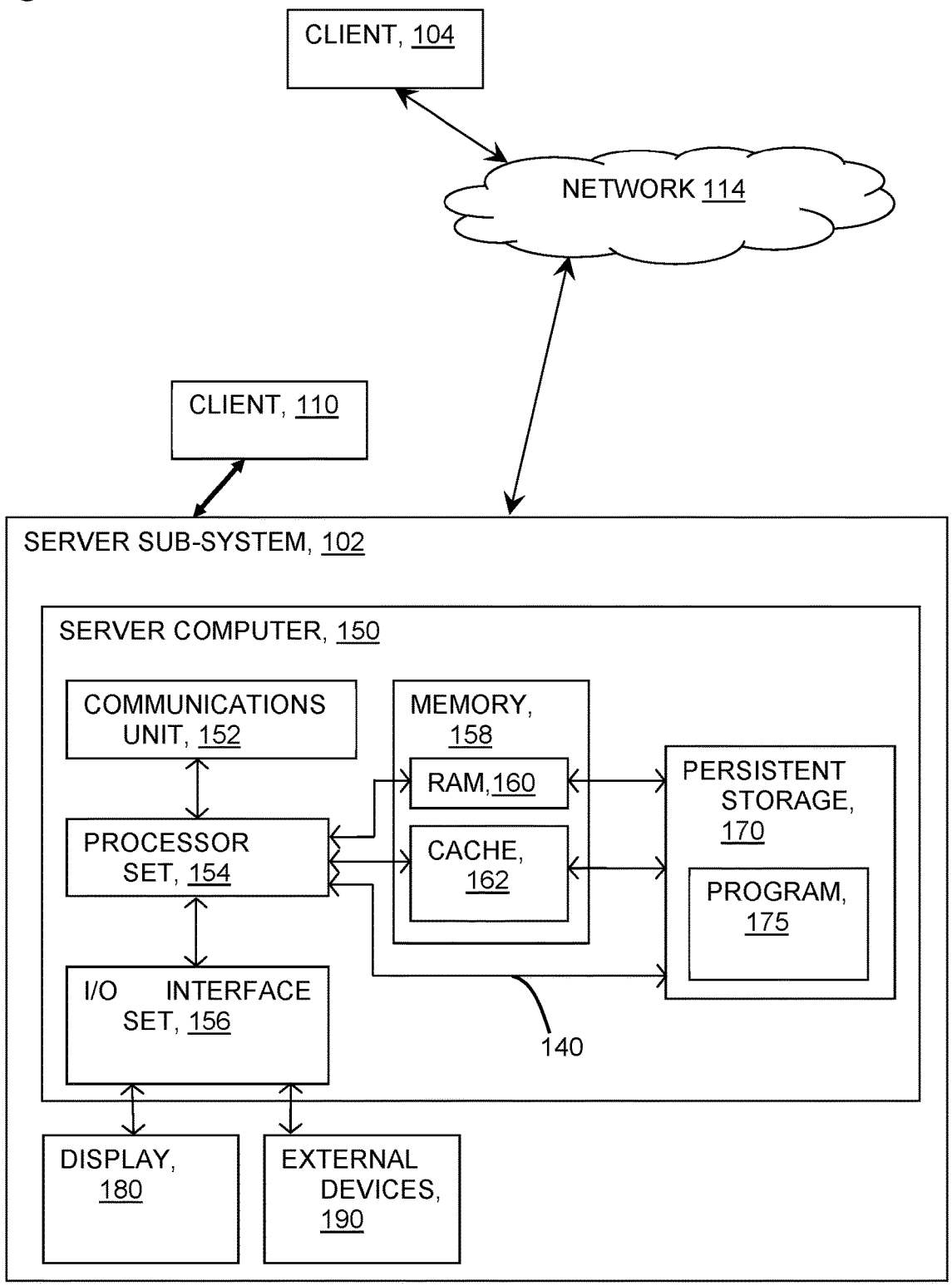
FIG. 1 provides a schematic illustration of a system, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

In an embodiment, one or more components of the system can employ hardware and/or software to solve problems that are highly technical in nature (e.g., determining best model parameters, determining descendant parameters, conducting model training, determining model training scores, etc.). These solutions are not abstract and cannot be performed as a set of mental acts by a human due to the processing capabilities needed to facilitate endpoint device remediation, for example. Further, some of the processes performed may be performed by a specialized computer for carrying out defined tasks related to memory operations. For example, a specialized computer can be employed to carry out tasks related to training machine learning systems or the like.

The computing resource needs associated with machine learning activities, including neural networks, can be satisfied using scalable cloud computing resources. These resources are not homogeneous and can vary across the cloud environment in terms of the resource capabilities, speed and network connectivity. Synchronous training of neutral networks includes the determination and application of a set of node weights for the neural network and associated training algorithm. The set of node weights are determined for each iteration of training and applied synchronously across the nodes of the network. For a neural network distributed across a heterogeneous cloud environment, this can mean waiting for the slowest portion of the environment to complete an iteration and associated weight determination, before applying the new set of weights to the network nodes and beginning the next iteration of training. What is needed is a training method which more effectively exploits the heterogeneous nature of the cloud computing environment while also delivering optimally trained machine learning models.

Distributed neural networks may be trained asynchronously, where network weightings and gradients are determined over a series of training iterations without waiting for each iteration to complete before applying partial gradient determinations to the model. Asynchronous training typically involves the application of a fixed model and a single algorithm with a set of hyper parameters to the development of the distributed neural network. The resulting model is trained according to the selected algorithm and parameters, but the result is not necessarily the optimal model possible from the training data set for the end use application. What is needed is a methodology to evaluate multiple algorithms and parameter values across a flexible model structure to determine an optimal model for the end use from the training data set.

In an embodiment, a set of software agents train a machine learning model. The set of agents includes a learning master agent and a plurality of trainer agents. In some embodiments, the set further includes sub-trainer agents which are subordinate to the trainer agents. The learning manager receives training scores from the trainers. Each training score is associated with a set of model parameters used by the trainer in conjunction with a particular algorithm, to train a model.

Neural networks are trained using training data sets, with labeled, or categorized data as well as unlabeled, or uncategorized data. The neural networks are trained to minimize the loss function of the model. The loss function determines the difference between the answer the model returns of input data and the desired answer for the input data. A model which returns the desired answer has a loss function value of zero for that instance of evaluating input data.

Neural network hyperparameters determine the structure of the network and define how the network is trained. Structural hyperparameters include the number of hidden layers and hidden units per layer between the input and output layers. Layers may be added until there is no improvement in the output error while processing training data. Dropout percentage is used to prevent overfitting of the trained network. The dropout value defines the number of network units which are dropped out or ignored while processing training data. Dropping the units out during training forces the network to process data without all nodes/units, leading to a more generalized network.

Network node weights may be initialized according to a distribution function. Uniform initial weights are common, weights may also be initialized according to the activation function used for the units of each layer. The activation, or transfer, function of network nodes defines the output of the node for any given input. Network node weights may also be referred to as the parameters of the model. As training progresses, node parameters are altered by the training algorithm to impact the performance of the model as indicated by the loss function calculation. The trained model includes a final set of node weights (model parameters) which are used to process new data as the end use problem.

Network training hyperparameters include: learning rate, momentum, number of epochs and batch size. Learning rate defines the replacement of network parameters with new, updated values. Too low a rate can result in too much time required for training or a model converged upon a local minimum. Too high a rate can result in training which does not converge to a useable model. Learning rate may be constant or may decrease as training progresses, taking more time in later stages but yielding a more accurate model.

Network momentum values define the extent to which previous changes in node weights are considered in making the next node parameter change. Higher values (close to 1) emphasize the last change to the network parameters while values close to 0 emphasize node parameter gradient changes necessary to minimize the loss function (network error).

Epoch size relates to the number of iterations of the training data set through the model during the training period. Batch size is the number of data samples processed by the model before the node parameters are updated.

Models may be trained using statically defined hyperparameters and methods including gradient descent, stochastic gradient descent (SGD), SGD with momentum, AdaGrad, Adam, and RMSProp.

Evolutionary algorithms (EA) may be used to evaluate sets of hyperparameters for a specific model to determine the optimal set of hyperparameters for a given model-training dataset combination. EA evaluate hyperparameter options using reproduction, mutation, recombination and selection. Different combinations and mutations of an original set of hyperparameter values are evaluated using a loss function to determine the set which has the least loss (error) for the training dataset.

Hyperparameter values can also be determined using a random approach where hyperparameter values are assigned using random number generators and the resulting hyperparameter set is evaluated using the loss function. Multiple randomized sets of hyperparameter values can be considered to determine an optimal (for the sets considered) hyperparameter value set.

Statically defined, evolved, and randomly determined hyperparameters each represent a limited approach to determining the hyperparameters for a specific neural network machine learning model. A broader approach considering more potential options in a structured manner is required.

In an embodiment, a first software agent, the learning manager, manages lists of training model hyperparameters, creates descendant lists of hyperparameters, and assigns training tasks to a plurality of second software agents, the trainers. The learning manager receives training score results associated with the assigned tasks and descendant hyperparameter lists, from the trainers. In this embodiment, the learning manager creates initial hyperparameter value sets and assigns value sets and training algorithms to the trainers. In an embodiment, the learning manager uses random number generators to initialize the hyperparameter values. In an embodiment, the learning manager creates the hyperparameter value sets using user provided inputs. In an embodiment, the same set of hyperparameter values and algorithms are sent to multiple trainers, and each trainer receives a different set of training data. In an embodiment, the learning manager sends different value sets, algorithms, and training data to different trainers. In an embodiment, the learning manager sends hyperparameter values sets including ranges for hyperparameter values, to the trainers together with one or more algorithms and training data sets.

Each trainer trains a model using the assigned value sets and algorithm. Each trainer uses a unique training data set to build the model using the value set and algorithm. Each trainer determines a score associated with the loss function for the trained model. The model parameter list and evaluation score of the trained model are sent to the learning manger. In an embodiment, a trainer sends specific hyperparameter values sets and algorithms, selected from a hyperparameter value and algorithm sets including ranges, to third software agents, sub-trainers. In this embodiment, the sub-trainers train models using the provided hyperparameters, algorithm, and training data. The sub-trainers score the performance of the trained model and communicate the model parameter listing and score result to the trainer or directly to the learning manager.

In an embodiment, the learning manger receives the respective parameter lists and scores from the trainers and/or sub-trainers. The learning manager ranks the set of received scores and determines a best score and associated best model parameter set for the current training data set and end use problem. In this embodiment, the learning manger iterates new sets of descendant model parameter lists and sends these to trainers for evaluation. As before, the trainers train models using the provided best parameter lists, hyperparameter value sets and algorithms, evaluate the trained model performance and send the performance scores and new model parameter lists to the learning manager. In this embodiment, the trainers evaluate the descendant parameter list in view of previous results. Training continues for parameter lists having evaluation scores superior to previous results, or within a threshold level difference from previous evaluation scores. Threshold values are set by system users according to available time and system resource constraints. All evaluation score, parameter list, hyperparameter values set, algorithm combinations, both superior and inferior, are reported to the learning manager.

In an embodiment, the trainers include multiple computational threads. In this embodiment, a trainer has a thread for training models using the descendant parameter, hyperparameter value, algorithm combination, and a second thread for communications with the learning manager and sub-trainers. In this embodiment, the trainers are run on either central processing units (CPU) or graphics processing units (GPU) of local or cloud-based resources. Trainers process training data in mini batches according to hyperparameter value settings for batch size.

In an embodiment, the learning manager passes synchronous training tasks to the trainers. In this embodiment, the tasks include the same set of hyperparameter values and learning algorithm, the best parameter lists are determined using the model parameter lists from the set of trainers/sub-trainers, and the descendant parameter lists are determined as the average values of the parameters taken across the set of all trainers.

In an embodiment, the learning manager passes asynchronous training tasks to the trainers. In this embodiment, the tasks include the same set of hyperparameter values and learning algorithm, the best parameter lists are determined using the model parameter lists from the set of trainers/sub-trainers, and the descendant parameter lists are determined as the average values of the parameters taken across only limited sets of neighboring trainers. Averaging parameter values across neighboring trainers avoids issues associated with synchronous training averages taken across an entire set of trainers having variations in trainer performance due to computing device and network connectivity differences.

In an embodiment, the learning manager receives the updated score-parameter, hyperparameter value set, and algorithm combinations and iterates new best model parameter lists and new sets of descendant model parameter listings for use by the trainers, as average values taken across the entire set or only portions of the set of trainers. In this embodiment, the learning manager send tasks associated with the new best parameter list and the new descendant list to trainers. In this embodiment, some trainers train models with the new parameters and previously used hyperparameter values and algorithms, in some instances, the trainers alter the model parameters as well as the hyperparameters and training algorithms according to the tasks from the learning manager.

In an embodiment, the method evaluates numerous hyperparameter value-algorithm combinations to identify the best combination associated with the training dataset and end use problem. The method exploits available resources without resource capabilities and network connectivity differences impacting the method's result. In an embodiment, the method utilizes multiple cloud resource tenancies to conduct the training tasks of the learning manager to identify the optimal parameter, hyperparameter, algorithm combination to create a model for the end use problem.

In an embodiment, each trainer processes its unique stream of input data using two threads. Thread1 determines the node weights (parameters) of the model. Thread2 continuously calculates model gradients based upon the input data stream and current set of model parameters. In this embodiment, thread1 uses the current local gradient to calculate updated model parameters. Thread1 applies all local gradients received from thread2 in determining the local weights. Thread1 sends task identification and local evaluation scores to the learning manager. The learning manager responds directing the trainer to either continue calculating weights and sending scores, or to start a new training session using a new weight vector, hyperparameters, and algorithm. In this embodiment, thread1 responds by either continuing to calculate and send weights, or by aborting the current training and beginning again using the new information provided by the learning manager.

In this embodiment, thread2 computes new gradients and evaluation scores using the current weights, hyperparameters, and algorithm. The new gradients and scores are sent to thread 1 for use and for forwarding to the learning manager. Thread2 initiates the new training when new parameters, hyperparameters and algorithms are received from the learning manager; otherwise, thread2 continues with the current parameters, hyperparameters, and algorithm. In this embodiment, updates to the model are paused when data is being sent to the learning manager. Updates resume after the current data has been sent. New gradients received while training is paused are held for use in the next iteration of weight calculation.

In an embodiment, the learning manager maintains two computing threads to manage parameter lists and continuously determine best parameter and descendant parameter lists for the trainers. Thread1 receives task identifications, parameter lists and local scores from trainers. The learning manager evaluates the received scores against current best parameter scores and a progression threshold set by a user. Scores above the best parameter list score, or within the threshold of the best parameter list score are used to replace the best parameter list. The learning manager instructs the trainer to continue training with the parameters. The learning manager replies to the trainer with a new descendant parameter list and potentially new hyperparameters and algorithms when the score is below the threshold value.

In this embodiment, thread2 creates lists of descendant model parameters from the current list of best model parameters. Thread2 calculates average parameter values across either the entire set of trainers or portions of the set of trainers. In an embodiment, thread2 calculates average parameter values using neighboring trainers having similar computing capabilities and network connectivity levels.

In an embodiment, the fault tolerance of the method and systems are improved by replicating the learning manager at a second location and operating the secondary learning manager in parallel with the first and distributing learning managers and trainers across multiple cloud resource tenancies. Distributing the elements of the systems provides tolerance for slow trainer nodes and poor connectivity by enabling asynchronous progress in training to occur. In an embodiment, the system includes node failure detection software to monitor and alert in instances of trainer or learning manager node failure. The method shifts learning manager activities to a secondary learning manager upon detecting a failed primary learning manager. In an embodiment, the method tracks responses from trainers. The learning manager marks tasks having no response after a defined threshold response time, as unassigned and subsequently assigns the tasks to a new trainer. The trainers track responses from the learning manager. The trainers shift communications to the secondary learning manager after a defined threshold time with no response from the learning manager.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise machine learning training program (not shown) together with sufficient computing resource (processor, memory, network communications hardware) to execute the program. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the machine learning training program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., machine learning training program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
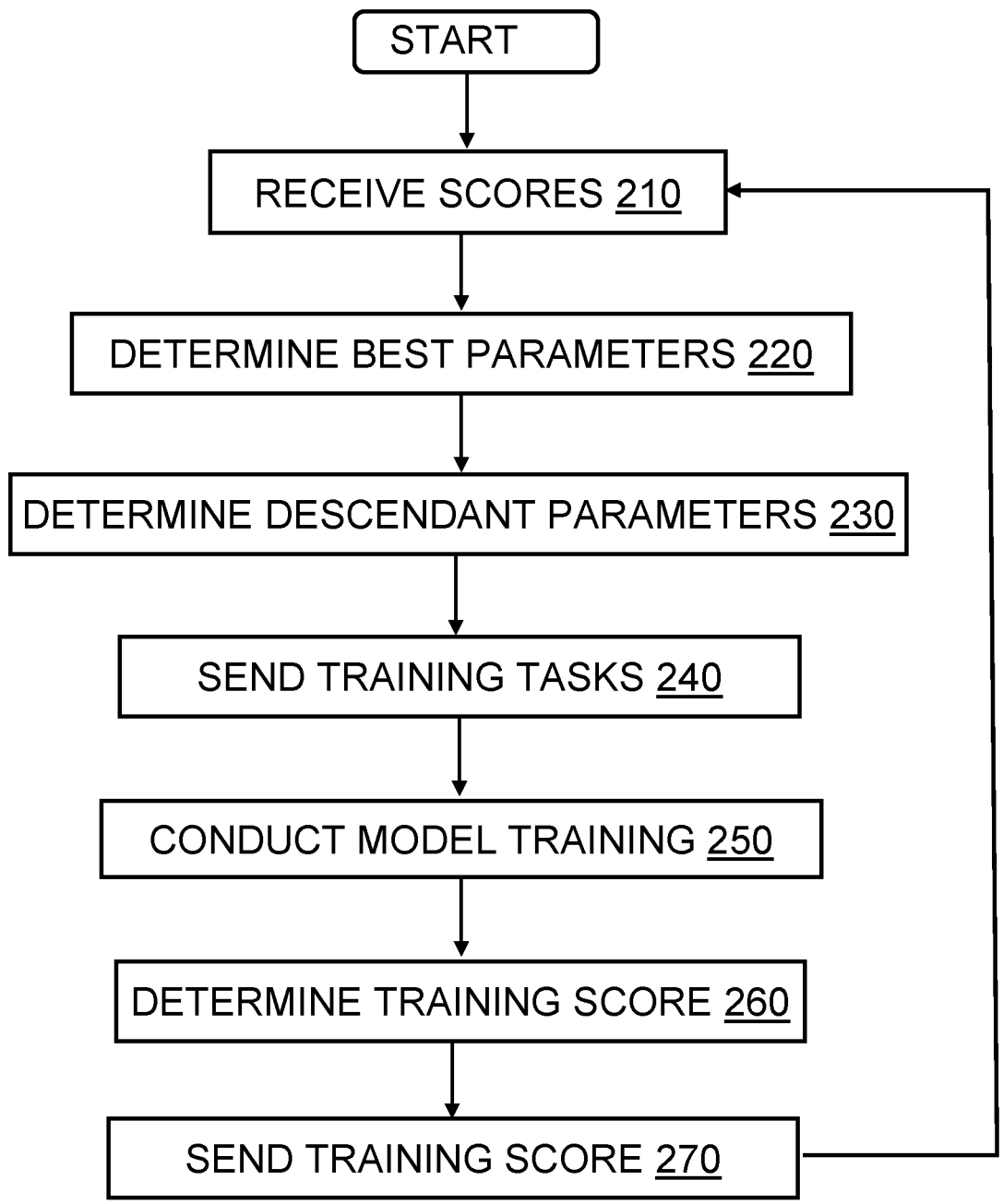
FIG. 2 provides a flowchart depicting an operational sequence, according to an embodiment of the invention.

FIG. 2 provides a flowchart 200, illustrating exemplary activities associated with the practice of the disclosure. After program start, the learning manager of program 175 assigns training tasks to one or more software agent trainers of the program 175. The assigned tasks include model parameters, hyperparameters, and training algorithms. At 210, the learning manager of program 175 receives training scores from the trainers of program 175 associated with the assigned tasks. At 220 the learning manager determines lists of best model parameters according to the received training scores and the associated model parameters. At 230, the learning manager determines descendant parameters according to the best parameter lists. In one embodiment, the learning manager averages the values of a parameter across all trainers to determine the descendant parameter value. In an embodiment, the learning manager averages parameter values across neighboring trainers to calculate the descendant parameter value.

At 240, learning manager of program 175 sends training tasks associated with the descendant parameters, to software agent trainers of the program 175. The tasks include the descendant parameters, hyperparameters, and algorithms for training a model. At 250, the trainers of program 175 conduct model training according to the descendant parameters, hyperparameters, and algorithms provided by the learning manager. At 260 the trainers determine the training score associated with the model trained with the descendant parameters. At 270 the trainer sends the task id and score to the learning manager to begin the next iteration at 210. After sufficient iterations, determined by a user defined error threshold, or a user defined number of iterations, the method of the program provides a neural network machine learning model for the end use problem.

Sample Effectiveness:

Table 1 illustrates the use of the methods of the invention over the course of 15 iterations in selecting an optimal training algorithm. The table illustrates iterations using each of the BN50-DNN, Deep Neural Network dataset task, and the SWB300 Long-short-term memory neural network switchboard dataset.

TABLE 1

Training algorithm by dataset and iteration:

| | optimizer | |
|---|---|---|
| generation | BN50 DNN | SWB300 LSTM |
| 1 | adam, lr = 2.68e−4 | adam, lr = 5.39e−4 |
| 2 | adam, lr = 1.10e−4 | adam, lr = 4.61e−5 |
| 3 | adam, lr = 1.87e−4 | adam, lr = 9.65e−5 |
| 4 | sgd, nesterov = F, lr = 3.61e−4, momentum = 0 | sgd, nesterov = F, lr = 9.92e−3, momentum = 0.21 |
| 5 | adam, lr = 9.07e−5 | sgd, nesterov = T, lr = 6.60e−3, momentum = 0.35 |
| 6 | adam, lr = 1.04e−4 | adam, lr = 4.48e−5 |
| 7 | sgd, nesterov = F, lr = 5.20e−4, momentum = 0 | sgd, nesterov = T, lr = 5.60e−3, momentum = 0.11 |
| 8 | sgd, nesterov = T, lr = 1.00e−4, momentum = 0.44 | sgd, nesterov = T, lr = 5.15e−3, momentum=0.49 |
| 9 | adam, lr = 6.45e−5 | adam, lr = 3.20e−5 |
| 10 | adam, lr = 7.51e−5 | adam, lr = 2.05e−5 |
| 11 | adam, lr = 4.51e−5 | adam, lr = 1.97e−5 |
| 12 | sgd, nesterov = F, lr = 4.19e−5, momentum = 0 | adam, lr = 2.98e−5 |
| 13 | sgd, nesterov = F, lr = 6.17e−5, momentum = 0.25 | adam, lr = 1.94e−5 |
| 14 | sgd, nesterov = F, lr = 6.73e−5, momentum = 0.45 | adam, lr = 1.33e−5 |
| 15 | sgd, nesterov = F, lr = 1.00e−4, momentum = 0 | adam, lr = 1.45e−5 |

Table 2 illustrates the number of descendant model parameter groups identified by the method in each of the BN50-DNN and SWB300-LSTM datasets over the 15 iterations:

TABLE 2

| | optimizer | |
|---|---|---|
| generation | BN50 DNN | SWB300 LSTM |
| 1 | 0 | 2 |
| 2 | 0 | 8 |
| 3 | 2 | 5 |
| 4 | 1 | 15 |
| 5 | 2 | 21 |
| 6 | 1 | 25 |
| 7 | 4 | 39 |
| 8 | 3 | 47 |
| 9 | 4 | 45 |
| 10 | 13 | 44 |
| 11 | 20 | 43 |
| 12 | 32 | 51 |
| 13 | 35 | 54 |
| 14 | 35 | 45 |
| 15 | 18 | 46 |

Number of Descendant Model Parameter Sets Per Iteration/Generation

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
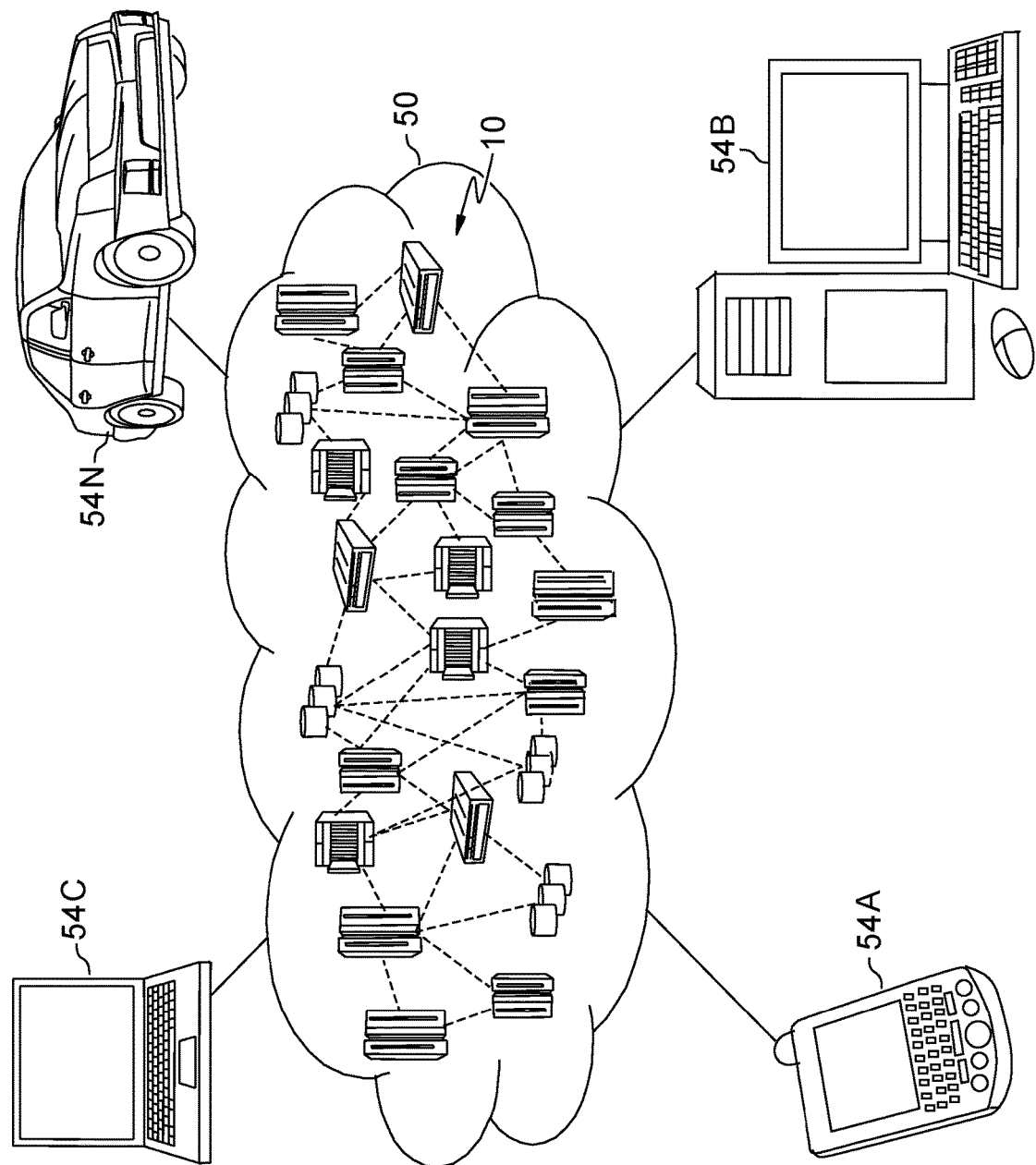
FIG. 3 depicts a cloud computing environment, according to an embodiment of the invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
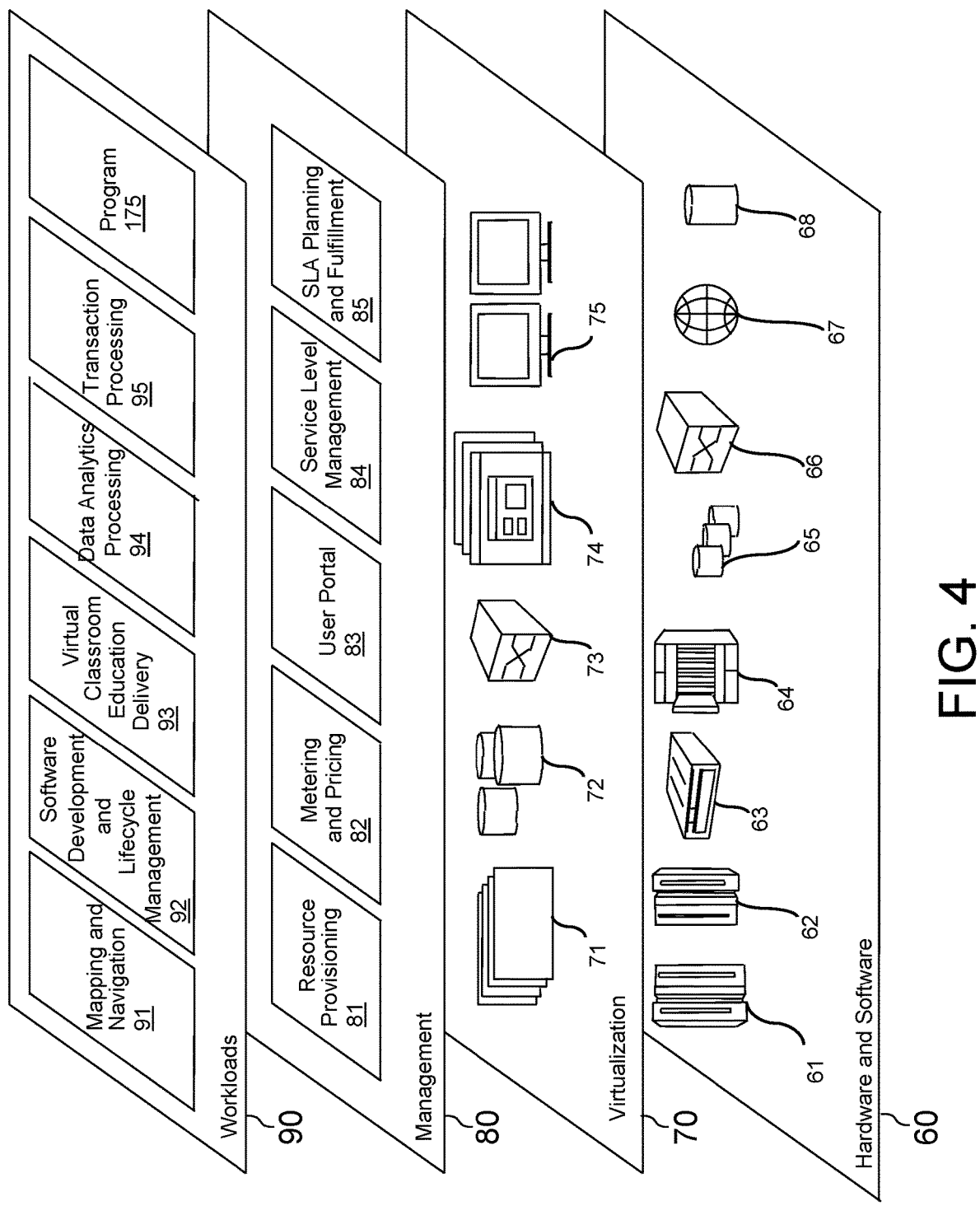
FIG. 4 depicts abstraction model layers, according to an embodiment of the invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and machine learning program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for providing machine learning models, the method comprising:
    creating a first learning manager and a second learning manager, wherein the second learning manager is a replica of the first learning manager, and wherein the first learning manager and second learning manager are distributed across different locations in multiple cloud tenancies;
    receiving, by the first learning manager utilizing a first computing thread, a plurality of training process scores associated with model parameter lists;

determining, by the first learning manager utilizing the first computing thread, a best model parameter list according to the training process scores;

determining, by the first learning manager utilizing a second computing thread, a descendant model parameter list according to the best model parameter list, wherein the descendant model parameter list comprise a portion of the best model parameter list;

distributing, by the first learning manager, the descendant model parameter list;

conducting, by a first trainer, a neural network model training process according to the descendant model parameter list, wherein the training process comprises utilizing a third computing thread to determine node weight parameters of the model, and using a fourth computing thread to continuously calculate model gradients based upon the descendant model parameter list, wherein the third computing thread utilizes the calculated model gradients to determine the node weight parameters, determining an evaluation score according to a loss function;

sending, by the first trainer to the first learning manager, the evaluation score associated with the descendant model parameter list;

detecting, by one or more computer processors, a failure of the first learning manager;

shifting learning manager tasks to the second learning manager; and providing a trained neural network model according to the evaluation score.

2. The computer implemented method according to claim 1, further comprising providing a machine learning model trained using the best model parameter list.

3. The computer implemented method according to claim 1, further comprising:
evaluating, by the one or more computer processors, the descendant model parameter list training score according to a threshold; and
continuing, by the one or more computer processors, the model training process according to the descendant model parameter list.

4. The computer implemented method according to claim 1, further comprising conducting a plurality of model training processes, wherein each model training process is conducted using a unique input data set.

5. The computer implemented method according to claim 1, further comprising:
determining, by the one or more computer processors, descendant model parameters according to average model parameter values across a complete set of training process scores.

6. The computer implemented method according to claim 1, further comprising:
determining, by the one or more computer processors, descendant model parameters according to average model parameter values across a partial set of training process scores.

7. The computer implemented method according to claim 1, wherein conducting the model training process comprises using a first model training thread and a second communications thread.

8. A computer program product for providing a trained machine learning model, the computer program product comprising one or more computer readable storage devices and stored program instructions on the one or more computer readable storage devices, the stored program instructions comprising:

program instructions to create a first learning manager and a second learning manager, wherein the second learning manager is a replica of the first learning manager, and wherein the first learning manager and second learning manager are distributed across different locations in multiple cloud tenancies;

program instructions to receive, a plurality of training process scores associated with model parameter lists;

program instructions to determine, a best model parameter list according to the training process scores;

program instructions to determine descendant model parameter list according to the best model parameter list, wherein the descendant model parameter list comprises a portion of the best model parameter list;

program instructions to distribute the descendant model parameter list;

program instructions to conduct a neural network model training process according to the descendant model parameter list, wherein the training process comprises utilizing a third computing thread to determine node weight parameters of the model, and using a fourth computing thread to continuously calculate model gradients based upon the descendant model parameter list, wherein the third computing thread utilizes the calculated model gradients to determine the node weight parameters, determining an evaluation score according to a loss function;

program instructions to send the evaluation score for the descendant model parameter list;

program instructions to detect a failure of the first learning manager;

program instructions to shift learning manager tasks to the second learning manager; and program instructions to provide a trained neural network model according to the evaluation score.

9. The computer program product according to claim 8, further comprising providing a machine learning model trained using the best model parameter list.

10. The computer program product according to claim 8, further comprising program instructions to:
evaluate the descendant model parameter list training score according to a threshold; and
continue the model training process according to the descendant model parameter list.

11. The computer program product according to claim 8, further comprising conducting a plurality of model training processes, wherein each model training process is conducted using a unique input data set.

12. The computer program product according to claim 8, further comprising program instructions to determine descendant model parameters according to average model parameter values across a complete set of training process scores.

13. The computer program product according to claim 8, further comprising program instructions to determine descendant model parameters according to average model parameter values across a partial set of training process scores.

14. The computer program product according to claim 8, wherein conducting the model training process comprises using a first model training thread and a second communications thread.

15. A computer system for providing a trained machine learning model, the computer system comprising:
one or more computer processors;
one or more computer readable storage devices; and stored program instructions on the one or more computer readable storage devices for execution by the one or more computer processors, the stored program instructions comprising:

program instructions to create a first learning manager and a second learning manager, wherein the second learning manager is a replica of the first learning manager, and wherein the first learning manager and second learning manager are distributed across different locations in multiple cloud tenancies;

program instructions to receive, a plurality of training process scores associated with model parameter lists;

program instructions to determine, a best model parameter list according to the training process scores;

program instructions to determine descendant model parameter list according to the best model parameter list, wherein the descendant model parameter list comprises a portion of the best model parameter list;

program instructions to distribute the descendant model parameter list;

program instructions to conduct a neural network model training process according to the descendant model parameter list, wherein the training process comprises utilizing a third computing thread to determine node weight parameters of the model, and using a fourth computing thread to continuously calculate model gradients based upon the descendant model parameter list, wherein the third computing thread utilizes the calculated model gradients to determine the node weight parameters, determining an evaluation score according to a loss function;

program instructions to send the evaluation score for the descendant model parameter list;

program instructions to detect a failure of the first learning manager;

program instructions to shift learning manager tasks to the second learning manager; and program instructions to provide a trained neural network model according to the evaluation score.

16. The computer system according to claim 15, further comprising program instructions to:

evaluate the descendant model parameter list training score according to a threshold; and continue the model training process according to the descendant model parameter list.

17. The computer system according to claim 15, further comprising conducting a plurality of model training processes, wherein each model training process is conducted using a unique input data set.

18. The computer system according to claim 15, further comprising program instructions to determine descendant model parameters according to average model parameter values across a complete set of training process scores.

19. The computer system according to claim 15, further comprising program instructions to determine descendant model parameters according to average model parameter values across a partial set of training process scores.

20. The computer system according to claim 15, wherein conducting the model training process comprises using a first model training thread and a second communications thread.

* * * * *